United States Patent [19]
Kabat

[11] 3,789,283
[45] Jan. 29, 1974

[54] CONDITION CONTROL REVERSIBLE MOTOR SYSTEM

[75] Inventor: John L. Kabat, Bloomington, Minn.
[73] Assignee: Honeywell Inc., Minneapolis, Minn.
[22] Filed: Feb. 20, 1973
[21] Appl. No.: 333,584

[52] U.S. Cl. ................................ 318/295, 318/663
[51] Int. Cl. ............................................. G05b 1/06
[58] Field of Search ... 318/294, 295, 471, 563, 663, 318/666, 677

[56] References Cited
UNITED STATES PATENTS

| | | | |
|---|---|---|---|
| 3,731,173 | 5/1973 | Pinckaers | 318/295 X |
| 3,697,849 | 10/1972 | Uchida | 318/663 X |
| 3,400,315 | 9/1968 | Doucette | 318/663 X |
| 3,323,031 | 5/1967 | Kasper et al. | 318/295 X |

Primary Examiner—Bernard A. Gilheany
Assistant Examiner—W. E. Duncanson, Jr.
Attorney, Agent, or Firm—Lamont B. Koontz; Omund R. Dahle

[57] ABSTRACT

A condition control reversible motor system operates to rebalance a bridge circuit by means of a feedback potentiometer, the potentiometer wiper providing the energization potential to the bridge circuit. A reference voltage source and a lightly back-biased diode are connected to the bridge circuit in order to insure that the system always drives to a preferred or safe end in the event that the feedback potentiometer wiper open-circuits from the potentiometer resistive element due to dirt or some other defect.

6 Claims, 2 Drawing Figures

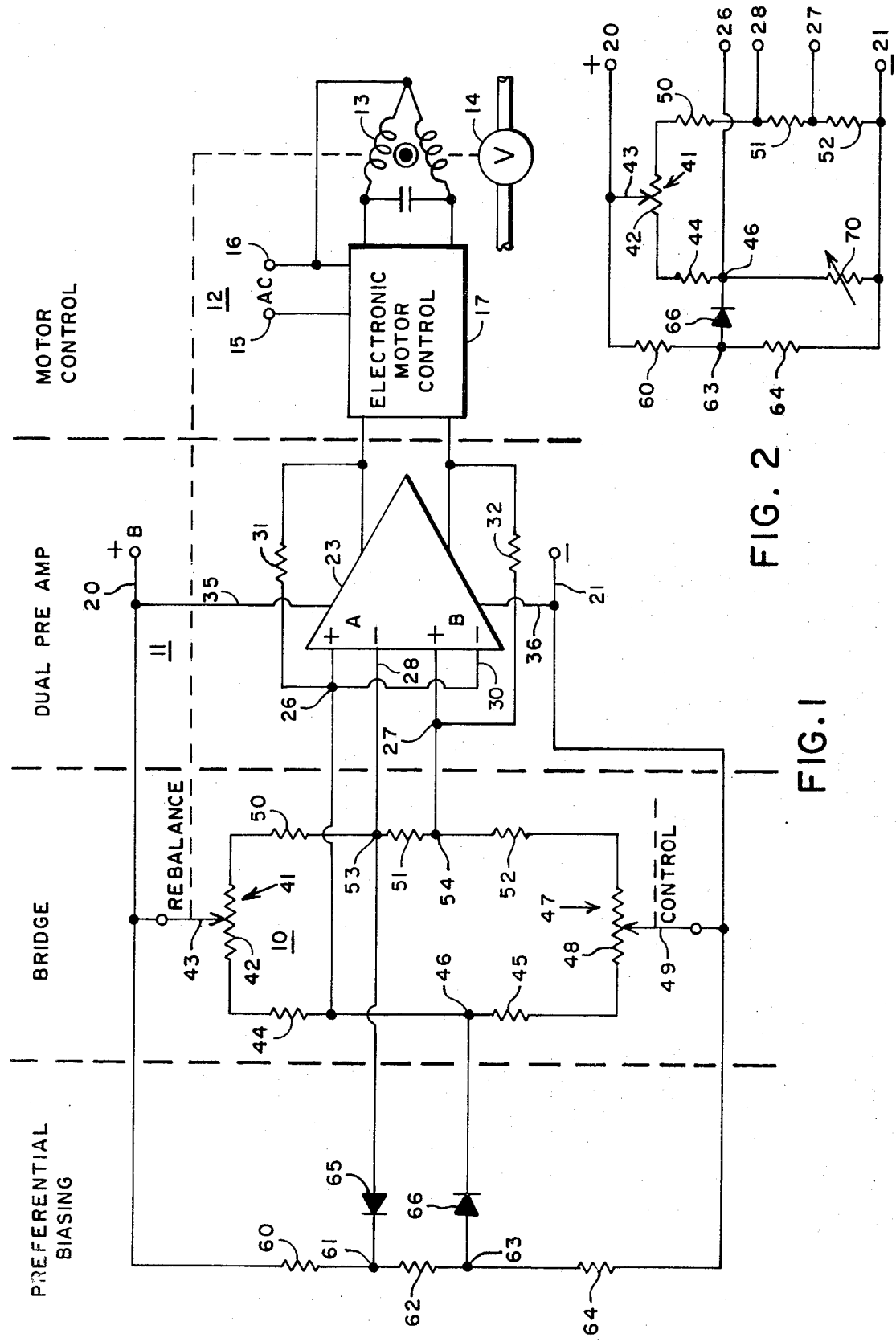

3,789,283

CONDITION CONTROL REVERSIBLE MOTOR SYSTEM

BACKGROUND AND SUMMARY OF THE INVENTION

In the copending application, Ser. No. 273,245 filed July 19, 1972 in the name of B. Hubert Pinckaers, and assigned to the same assignee as the present application, now U.S. Pat. No. 3,731,173 it is taught that in condition controlled reversible motor systems using a feedback potentiometer it is very desirable to provide some means to cause the motor system to drive to a preferred or safe position in the event that dirt or some other material builds up on the feedback potentiometer causing the wiper to lift from the potentiometer resistive element. This type of defect is not uncommon in motor feedback potentiometer systems, and many times the open-circuit causes a hunting effect which eventually leads to an open-circuiting either of the wiper connection or of the potentiometer resistance itself. In the copending application the emergency drive signal to the system is provided from a special output of the dual amplifier, which output is energized when the bridge voltage fails. A normally backbiased diode isolates this special output from the bridge except when the wiper lifts and the energizing potential is lost from the bridge.

The present invention is directed to a modification of this type of system in which a reference voltage is connected through a diode to the bridge. The diode normally is back-biased in that the reference voltage is slightly less than the normal voltage range of the bridge point to which the diode is connected.

BRIEF DESCRIPTION OF THE DRAWING

FIG. 1 is a schematic representation of a bridge controlled reversible motor control system utilizing dual operational amplifiers to control the motor in response to a sensed condition; and FIG. 2 shows a modification of the bridge of FIG. 1.

DESCRIPTION OF THE PREFERRED EMBODIMENT

In general terms the system shown in FIG. 1 comprises an electrical condition responsive bridge circuit 10 which provides control signals to a dual preamplifier 11 which in turn controls an electronic motor control system 12. The reversible motor 13 positions a load, here shown as valve 14, and also mechanically drives the wiper of a feedback potentiometer in the bridge circuit.

The Motor Control

A conventional alternating current voltage source is connected at terminals 15 and 16 to energize an electronic motor control circuit 17 and the motor 13. The details of this electronic motor control form no part of the invention and are not shown in detail but if desired may be of the type shown in the copending application above identified. A source of direct current voltage is connected across conductors 20 and 21 to energize the remainder of the circuit. This voltage is obtained in any conventional way such as by rectifying the alternating current potential source.

The Dual Amp

The control system utilizes a dual operational amplifier 11 that has been disclosed schematically in a conventional manner at 23. The voltage source between conductors 20 and 21 supplies energy on conductors 35 and 36 to energize the dual operational amplifier 23. The amplifier 23 has sections designated as A and B. A non-inverting input terminal for the A section is disclosed at 26, while the non-inverting input terminal for the amplifier B is disclosed at 27. The inverting input terminal for amplifier A is disclosed at 28 and for amplifier B at 30. The dual operational amplifier may be of several commercially available types, such as the RC4558 commercially marketed by Raytheon Corporation. It may also be of the type generally known in the industry as the 747 type. Feedback resistors 31 and 32 around the amplifiers A and B, respectively, cause these amplifiers to operate as switches. The amplifier sections provide digital outputs, the first which may be termed the "off," "0" or "low" state and the second may be termed the "on," "1" or "high" state. When the output from amplifier A is high the motor is caused to drive the valve toward the closed position. When the output from amplifier B is high the motor is caused to drive the value 14 toward the open position.

The Bridge

The voltage source 20, 21 supplies energy to the condition responsive bridge voltage divider network generally disclosed at 10. This network includes a rebalance potentiometer 41 made up of a potentiometer resistor 42 and a potentiometer wiper 43, with the potentiometer wiper 43 being directly connected to the conductor 20. The positive voltage is thus applied to the bridge through the wiper 43. The left hand portion of the bridge includes a part of the potentiometer resistance 42, a fixed resistor 44, a junction or output terminal 46, a fixed resistor 45, and a portion of a potentiometer resistor 48 of a control potentiometer generally shown at 47. The control potentiometer 47 also includes a potentiometer wiper 49 which is directly connected to the negative conductor 21.

The right hand portion of the bridge includes a portion of the potentiometer resistor 42, a fixed resistor 50, a fixed resistor 51, a fixed resistor 52, and a portion of the potentiometer resistor 48. A bridge output terminal is between resistors 50 and 51, and a bridge output terminal 54 is between resistors 51 and 52. The bridge output terminal 46 is directly connected to the inverting input terminal 26 of the amplifier section A and to the non-inverting input terminal 30 of the amplifier section B. The bridge output terminal 53 is directly connected to the non-inverting input terminal 28 of the amplifier section A. The output terminal 54 of the bridge is directly connected to the non-inverting input terminal 27 of the amplifier section B. The input terminals 26 and 28 of amplifier section A are actually internally connected to the base electrodes of two transistors making up a differential amplifier input circuit within the op. amp. Amplifier terminals 27 and 30 of amplifier section B are internally connected in a similar fashion. The amplifiers A and B are responsive to the polarity of and magnitude of signal unbalance at the differential amplifier stage input terminals rather than to the absolute voltage level at the input terminals.

The Preferential Bias Circuit

The preferential biasing circuit shown at the left portion of the schematic is, in effect, a source of constant reference potential. In the specific embodiment shown, the preferential biasing circuit is in the form of a voltage divider comprising a resistor 60, a junction 61, a resistor 62, a junction 63 and a resistor 64. This voltage divider is energized from a regulated DC voltage source such as across conductors 20 and 21 thereby providing a source of constant reference potential at junction 61 and junction 63. A battery or the like could supply the constant voltage potential in place of the voltage divider. The resistor values 60, 62 and 64 are selectively chosen so that the voltage at junction 61 is slightly higher than the voltage at junction 53 of the bridge 10. A diode 65 is connected between the junctions 61 and 53 with the direction of easy current flow being toward junction 61. The existing potentials thus normally lightly back-bias diode 65. A diode 66 is connected between the junctions 63 and 46 with the direction of easy current flow of diode 66 being toward junction 46. The potential at junction 63 is chosen to be slightly less than the normal potential at junction 46 so that the diode 66 is normally lightly back-biased. The back-biased diodes 65 and 66 present an essentially infinite impedance to the bridge 10 so that under normal conditions the preferential biasing circuit is effectively isolated from and does not place any electrical load or connection to the bridge circuit.

Operation Under Normal Conditions

In general, when the bridge unbalances in a direction such that input 26 is positive with respect to input 28, the output of amplifier section A goes "high" tending to drive the valve in a closed direction. When the opposite direction of bridge unbalance occurs such that input terminal 27 is positive with respect to input terminal 30, the output of amplifier section B goes "high"-driving the motor in the opposite direction tending to open the valve 14. It can thus be seen that if a control signal moves the wiper 49 a predetermined distance toward the right along the resistive element 48, the direction of bridge unbalance will be in a direction to turn on the amplifier A and again to drive the valve 14 toward a closed position. Simultaneously the rebalance potentiometer wiper will be driven toward the right until the error signal from the bridge is reduced to zero. Under all normal operating conditions the diodes 65 and 66 remain reverse biased, and the preferential biasing circuit plays no part in the operation of the motor control.

Operation During Bridge Failure

A bridge failure will occur if the wiper lifts from one of the potentiometers 41 or 47 or both. This failure may be caused, for example, by accumulated dirt. It will be shown that in any of these conditions the motor always drives the valve in one direction. If the wiper 43 lifts away from the resistive element 42 of the potentiometer 41, the positive potential is removed from the bridge and the entire bridge potential tends to fall towards the negative voltage 21. The constant reference potential at point 63 now forward biases the diode 66 to maintain the junction 46 positive at a voltage level about 0.6 volts below the reference voltage. From terminal 46 a voltage divider path exists through the resistors 44, 42, 50, 51, 52, and a portion of 48 to the wiper 49. The amplifier A is receiving a potential on input 26 which is positive with respect to input terminal 28, thus causing the motor to drive the valve toward the closed position. At such time as the wiper 43 makes contact again with resistor 42, normal operation is resumed.

If wiper 49 lifts from the resistive element 48 of the potentiometer 47, the entire bridge tends to move toward the potential of the positive supply 20. A constant reference potential at junction 61 now forward biases the diode 65 and current flows from the junction 53 through the diode 65 to the junction 61 to maintain the junction 53 at a voltage level about 0.6 volts above the reference voltage. A voltage divider current path exists from the positive conductor 20 through wiper 43, the left portion of resistor 42, resistors 44, 45, 48, 52 and 51 to the junction 53 and then through the diode 65. The junction 46 is again positive with respect to the junction 53 and amplifier A again causes the motor to drive valve 14 toward a closed position.

In the more unlikely event that both wipers 43 and 49 lift from their respective potentiometer resistors, the preferential biasing circuit still causes the motor to drive the valve 14 in a closed direction. In the operational amplifiers 23 the input terminals 26 and 28 connect to the base electrodes of the transistors of a differential amplifier. The emitter electrodes of the transistors are connected through the conductor 36 to the negative potential 21 so that a current path can be traced from the bridge and amplifier to negative. Thus the potential of the bridge 10 tends to be drawn toward the negative voltage 21. In this event the diode 66 is forward biased to maintain the terminal 46 and input terminal 26 positive with respect to input 28 and again the motor drives the valve 14 toward the closed position.

FIG. 2 shows a modification of the bridge in which there is only one potentiometer 41. The lower portion of the bridge has a condition responsive element 70 connected to the negative conductor 21, and the lower terminal of resistor 52 is connected to the same terminal. This system operates in the same way as the system shown in FIG. 1. Since there is only one potentiometer wiper 43 which could lift, however, only one diode 66 is required to provide the emergency bias protection.

The embodiments of the invention in which an exclusive property or right is claimed are defined as follows:

1. Preferential bias for the bridge circuit of a motor control system to cause the motor to drive in a predetermined direction in the event of a loss of normal control signal comprising:

a condition responsive bridge circuit having output terminals adapted to provide control signals to electronic motor control means, said bridge circuit including potentiometer means having a resistive element and a wiper contact adjustable therealong;

a source of unidirectional energizing potential;

bridge circuit power input terminals, one of said input terminals being connected to said wiper contact of said potentiometer means for providing said energizing potential to said bridge circuit through said wiper contact, to provide a normal voltage range at a first of said output terminals; said bridge circuit sometimes being subject to an undersirable faulty operating condition in which said wiper loses contact with said resistive element and the bridge circuit does not receive energizing potential whereupon the control signal fails;

reference voltage means; and normally non-conductive diode means connected between said bridge circuit and said reference voltage means, which reference voltage means is of a magnitude to normally slightly back-bias said diode means, said back-biased diode means thus normally presenting a high impedance to said bridge circuit, until the occurrence of said wiper losing contact with said resistive element thus de-energizing said bridge circuit whereupon said diode means is forward biased by said reference voltage to provide a predetermined emergency control signal to said electronic motor control system.

2. The invention according to claim 1 in which the source of reference voltage comprises impedance voltage divider means having at least one reference voltage tap.

3. The invention according to claim 1 in which the diode means is connected to the bridge circuit at a bridge output terminal.

4. The invention according to claim 1 in which said bridge circuit includes a second potentiometer means connected on the opposite side of the bridge from the first mentioned potentiometer means and in which the other power input terminal is connected to the wiper contact of the second potentiometer means so that the potential to said bridge is applied through two potentiometer wipers.

5. The invention according to claim 4 in which said diode means comprises a first and a second diode, the first and second diodes being poled in opposite directions, the first diode being connected to one bridge output terminal and the second diode being connected to the other bridge output terminal, and both diodes being normally back-biased.

6. In an electronic motor control system of the type having a condition responsive bridge circuit providing control signals, the bridge circuit including potentiometer means having a resistive element and a wiper contact adjustable therealong, the bridge circuit being energized by a source of unidirectional potential which is connected to the wiper contact for providing energizing potential to the bridge circuit through the wiper contact, the bridge circuit sometimes being subject to an undersirable faulty operation condition in which the wiper loses contact with the resistive element and the bridge circuit does not receive energizing potential, the system requiring an emergency control signal in such condition to drive the motor in a predetermined direction, the improvement comprising:

a source of reference voltage and normally non-conductive diode means connected between the bridge circuit and said source of reference voltage, the reference voltage being of a magnitude to slightly back-bias said diode means normally thus normally presenting a high impedance to said bridge circuit and in effect isolating said source of reference voltage from said bridge circuit, until the occurrence of said wiper losing contact with said resistive element thus de-energizing said bridge circuit whereupon said diode means is forward biased by said reference voltage to provide a predetermined emergency control signal to said electronic motor control system.

* * * * *